US012563464B2

(12) United States Patent
Xu

(10) Patent No.: US 12,563,464 B2
(45) Date of Patent: Feb. 24, 2026

(54) REMOTE UE AND DATA TRANSMISSION METHOD THEREFOR, AND STORAGE MEDIUM

(71) Applicant: SPREADTRUM COMMUNICATIONS (SHANGHAI) CO., LTD., Shanghai (CN)

(72) Inventor: Min Xu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 676 days.

(21) Appl. No.: 17/923,923

(22) PCT Filed: Apr. 8, 2021

(86) PCT No.: PCT/CN2021/085987
§ 371 (c)(1),
(2) Date: Nov. 8, 2022

(87) PCT Pub. No.: WO2021/223563
PCT Pub. Date: Nov. 11, 2021

(65) Prior Publication Data
US 2023/0189100 A1 Jun. 15, 2023

(30) Foreign Application Priority Data
May 8, 2020 (CN) .......................... 202010383779.5

(51) Int. Cl.
*H04W 36/00* (2009.01)
(52) U.S. Cl.
CPC ..... *H04W 36/033* (2023.05); *H04W 36/0064* (2023.05)

(58) Field of Classification Search
CPC ........... H04W 36/033; H04W 36/0064; H04W 36/0011; H04W 88/04; H04W 92/18; H04W 68/02; Y02D 30/70
See application file for complete search history.

(56) References Cited

U.S. PATENT DOCUMENTS

| | | | | |
|---|---|---|---|---|
| 10,149,213 B2 * | 12/2018 | Tenny | ............... | H04W 36/0016 |
| 2018/0098370 A1 * | 4/2018 | Bangolae | ............. | H04W 76/27 |

(Continued)

FOREIGN PATENT DOCUMENTS

| | | |
|---|---|---|
| CN | 102164385 A | 8/2011 |
| CN | 102752820 A | 10/2012 |

(Continued)

OTHER PUBLICATIONS

Ericsson, "UE-to-Network Relay selection", 3GPP TSG-RAN WG2 #90, R2-152461, May 24, 2015. the whole document.
Lenovo, et al. "Handover of eRelay-UE with eRemote-UE(s) having an active indirect connection", SA WG2 Meeting #122, S2-1744969, Jul. 3, 2017. the whole document.

(Continued)

*Primary Examiner* — Habte Mered
(74) *Attorney, Agent, or Firm* — HAUPTMAN HAM, LLP

(57) ABSTRACT
A remote user equipment (UE) and a data transmission method therefor, and a storage medium are provided in the disclosure. The data transmission method for the remote UE includes the following. The remote UE receives a radio resource control (RRC) connection reconfiguration message, where the RRC connection reconfiguration message carries a configuration parameter of a relay UE, and transmits the configuration parameter to a corresponding relay UE.

20 Claims, 7 Drawing Sheets

(56) References Cited

U.S. PATENT DOCUMENTS

| | | | |
|---|---|---|---|
| 2018/0249516 A1* | 8/2018 | Jung ..................... | H04W 76/11 |
| 2023/0180313 A1* | 6/2023 | Freda ................... | H04W 76/14 |
| | | | 370/310 |
| 2024/0306059 A1* | 9/2024 | Zhang ............... | H04W 36/0061 |
| 2024/0414623 A1* | 12/2024 | Yao ....................... | H04W 40/22 |

FOREIGN PATENT DOCUMENTS

| | | | |
|---|---|---|---|
| CN | 107889080 A | 4/2018 |
| CN | 108207017 A | 6/2018 |
| CN | 109891947 A | 6/2019 |
| CN | 110461020 A | 11/2019 |
| CN | 110720238 A | 1/2020 |
| WO | 2018059126 A1 | 4/2018 |
| WO | 2019061167 A1 | 4/2019 |

OTHER PUBLICATIONS

The extended European search report issued in corresponding EP application No. 21799555.4 dated Oct. 2, 2023.

China Telecom, Running CR for introduction of even further mobility enhancement in E-UTRAN, 3GPP TSG-RAN2 Meeting # 107bis, R2-1912417, Oct. 18, 2019.

KYOCERA. Remaining issues of initiation of ProSe UE-to-Network Relays, 3GPP TSG-RAN WG2 #91bis, R2-154677, Oct. 9, 2015.

Zte et al. Discussion on relay initiation and discovery, 3GPP TSG RAN WG2 #91, R2-153765, Aug. 28, 2015.

WIPO, International Search Report and Written Opinion for International Application No. PCT/CN2021/085987, Jul. 8, 2021.

The first office action issued in corresponding CN application No. 202010383779.5 dated Apr. 1, 2021.

* cited by examiner

11

12

REMOTE UE AND DATA TRANSMISSION METHOD THEREFOR, AND STORAGE MEDIUM

CROSS-REFERENCE TO RELATED APPLICATION(S)

This application is a National Stage of International Application No. PCT/CN2021/085987, field Apr. 8, 2021, which claims priority to Chinese Patent Application No. 202010383779.5, filed May 8, 2020, the entire disclosures of which are hereby incorporated by reference.

TECHNICAL FIELD

The disclosure relates to the field of data communication technology, in particular to a remote user equipment (UE) and a data transmission method therefor, and a storage medium.

BACKGROUND

Vehicle to X (V2X for short, also called vehicle to everything) is the key technology of the future intelligent transportation system, which mainly focuses on 3rd generation partnership project (3GPP for short) communication protocol-based vehicle data transmission scheme. V2X communication includes vehicle to vehicle (V2V for short) communication, vehicle to infrastructure (V2I for short) communication, and vehicle to pedestrian (V2P for short) communication. V2X application will improve driving safety, reduce congestion and vehicle energy consumption, improve traffic efficiency and optimize in-vehicle entertainment information, etc. Meanwhile, V2X communication mode can also be applied to communication modes of other user terminals, such as proximity-based service (ProSe), but not limited to vehicle communication.

In V2X communication, V2V communication is a communication mode different from common wireless cellular network communication. In traditional cellular network, a user equipment (UE) communicates with a base station equipment, and user equipment communicates with each other through the base station and the core network. In V2V communication, the user equipment communicates directly with the user equipment, the link between user equipment becomes an Sidelink (SL), corresponding to a PC5 interface, and the interface between the user equipment and the base station equipment is a Uu interface. Sidelink discovery is mainly a process performed by ProSe UE before transmitting data with SL, which is used to discover the peer UE and transmit necessary information to establish SL. The UE mainly performs this process based on strategies and resources configured by the network.

The UE generally communicate with the base station through the Uu interface. However, the UE is mobile, and when the UE (e.g., remote UE) moves to a certain location, it may not be directly connected with the base station, or some UEs (remote UEs) are wearable mobile devices. In this case, the UE may be connected with the base station through another UE, which may be called a relay UE/relay terminal. The communication (e.g., direct data transmission) between two UEs is performed through the PC5 interface, and the relay UE is connected with the base station through the Uu interface, to achieve connection between the remote UE and the base station. When the remote UE is in a connected state, if the remote UE moves out of the coverage area of the source base station gradually, the source base station needs to initiate the handover process based on the measurement report of the UE. If the remote UE needs to connect with a target base station through the relay UE, for the remote UE, the handover process from Uu to PC5 across base stations occurs.

In 3GPP new radio (NR), NR UE has three states: RRC_IDLE/RRC_INACTIVE/RRC_CONNECTED state. In the IDLE state, the UE has no connection with base station and only needs to periodically initiate location update, cell selection/reselection process, and receive paging, etc. In the CONNECTED state, the UE is connected with the network, and the network configures UE radio bearer (RB), physical layer, and other configurations, including DC operation (in an intra-frequency scene or an inter-frequency scene, at least two cells are controlled by different gNB) and CA operation (controlled by the same base station), and the network can schedule uplink and downlink data for the UE. In INACTIVE state, when moving within a certain RNA range, the UE does not need to inform the base station, and the UE will reserve certain configurations (including packet data convergence protocol/service data adaptation protocol (PDCP/SDAP) and some low-layer configurations), and if the network needs to schedule the UE or the UE has data to transmit, the UE needs to transfer to the CONNECTED state and resume the reserved configurations for data transmission.

In the related art as shown in FIG. 1, the remote UE first discovers the relay UE and establishes the PC5 connection. Then, the remote UE informs the source base station to initiate a handover request to the target base station. When the relay UE is in the non-connected state, the target base station needs to page the relay UE, after the connection is initiated, the related bearer and the channel/cell group configuration, including the bearer configuration established for transmission of the data from the remote UE, are configured through the base station, and then the remote UE is switched to the new base station through the relay UE. This will cause the delay of handover across the base stations for the remote UE and also cause the handover failure.

The conditional handover (CHO) is introduced into NR R16, mainly to prevent the source base station from not transmitting the handover command to the UE in time due to the drastic change of the UE signal. So one or more candidate cells and their related configurations are preconfigured based on the UE measurement report, and the handover condition or trigger condition is configured at the same time, including reference signal receiving power (RSRP), reference signal receiving quality (RSRQ), or signal to interference plus noise ratio (SINR). When the condition is met, the UE directly switches to one of the candidate cells, initiates the random access procedure to the target cell and transmits a radio resource control (RRC) reconfiguration complete message, and then the source base station may be informed to release the UE connection, as shown in FIG. 2. When there is one or more candidate relay UEs, if each relay UE establishes the connection with the base station in advance through paging before the remote UE switches to a target relay UE, this will cause waste of resources. It can be considered that, after the remote UE meets the handover condition, the relay UE establishes the connection with the base station, but the common random access channel (RACH) resource may be used in the related art, which may have the risk of access failure, and thus certain time delay may be caused.

SUMMARY

In a first aspect of the disclosure, a data transmission method for a remote UE is provided. The method includes:

receiving a radio resource control (RRC) connection reconfiguration message, where the RRC connection reconfiguration message carries a configuration parameter of a relay UE; and transmitting the configuration parameter to a corresponding relay UE.

In a second aspect of the disclosure, a remote UE is provided. The remote UE includes a transceiver, a memory storing program codes, and a processor coupled with the memory and the transceiver. The processor is configured to invoke the program codes to perform the method of the first aspect.

In a third aspect of the disclosure, a non-transitory computer-readable storage medium is provided. The non-transitory computer-readable storage medium stores computer instructions. The computer instructions are configured to cause a remote UE to execute the method of the first aspect.

DETAILED DESCRIPTION

The disclosure is further described below by way of embodiments, but is not limited to the scope of the described embodiments.

Exemplary application scenarios of embodiments of the disclosure are described below.

The technical solutions of the disclosure can be applicable to 5G (5th generation) communication system, and further applied to 4G, 3G communication system, and even applied to various future new communication systems, such as 6G, 7G, etc. The technical solutions of the disclosure are also applicable to different network architectures, including but not limited to, relay network architectures, dual link architectures, vehicle-to-everything architectures, and the like. The embodiments of the disclosure are not limited herein. In the embodiments of the disclosure, the base station may provide a communication network for serving the terminal, including a base station in a radio access network, a base station controller in the radio access network, and an equipment in the core network. The base station controller is a device for managing a base station, for example, a base station controller (BSC) in a 2G network, a radio network controller (RNC) in a 3G network, and a device for controlling and managing a base station in a future new communication system.

Figure 1:
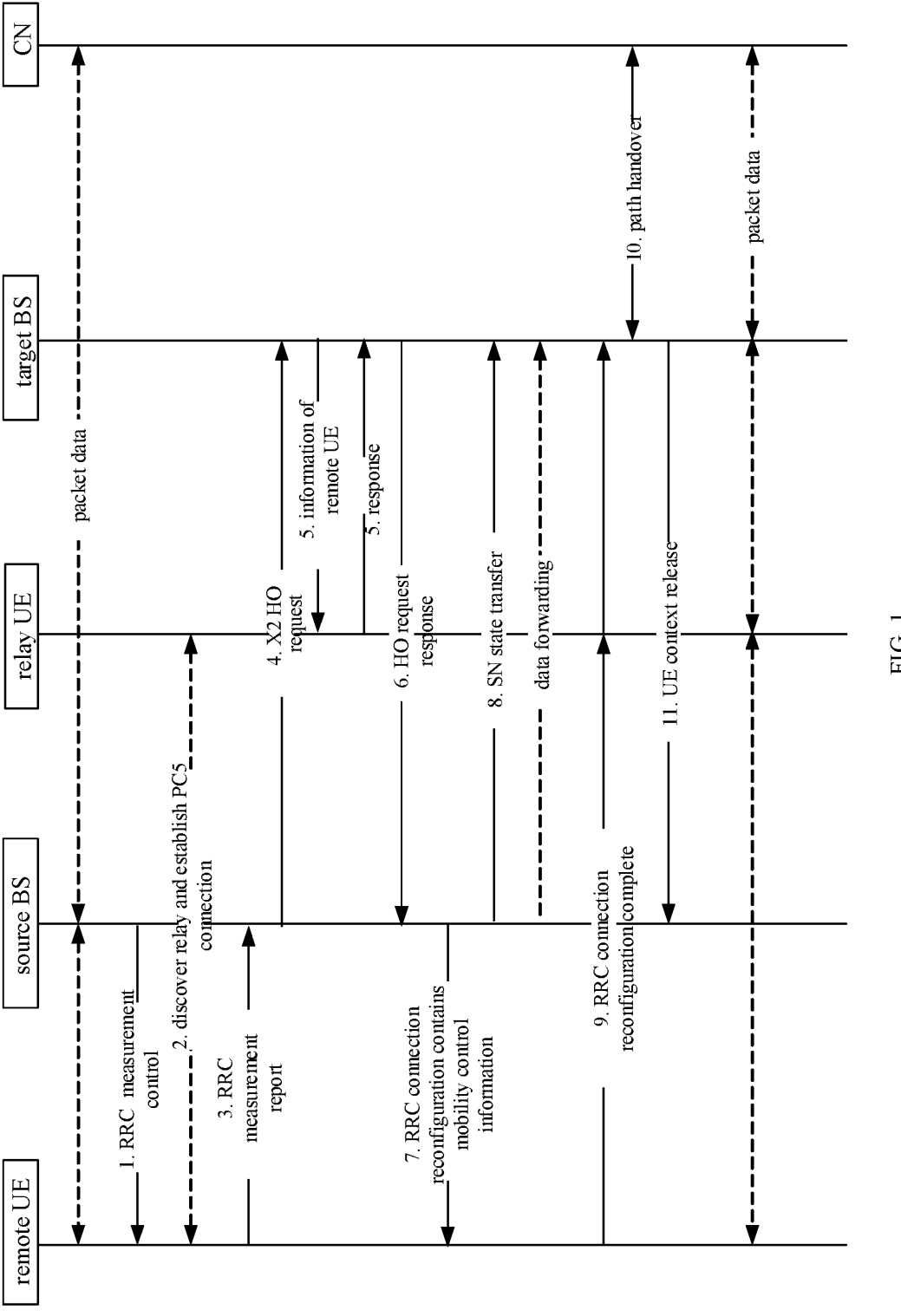
FIG. 1 is a call flow diagram of handover from Uu to PC5 across base stations in the related art.
Figure 2:
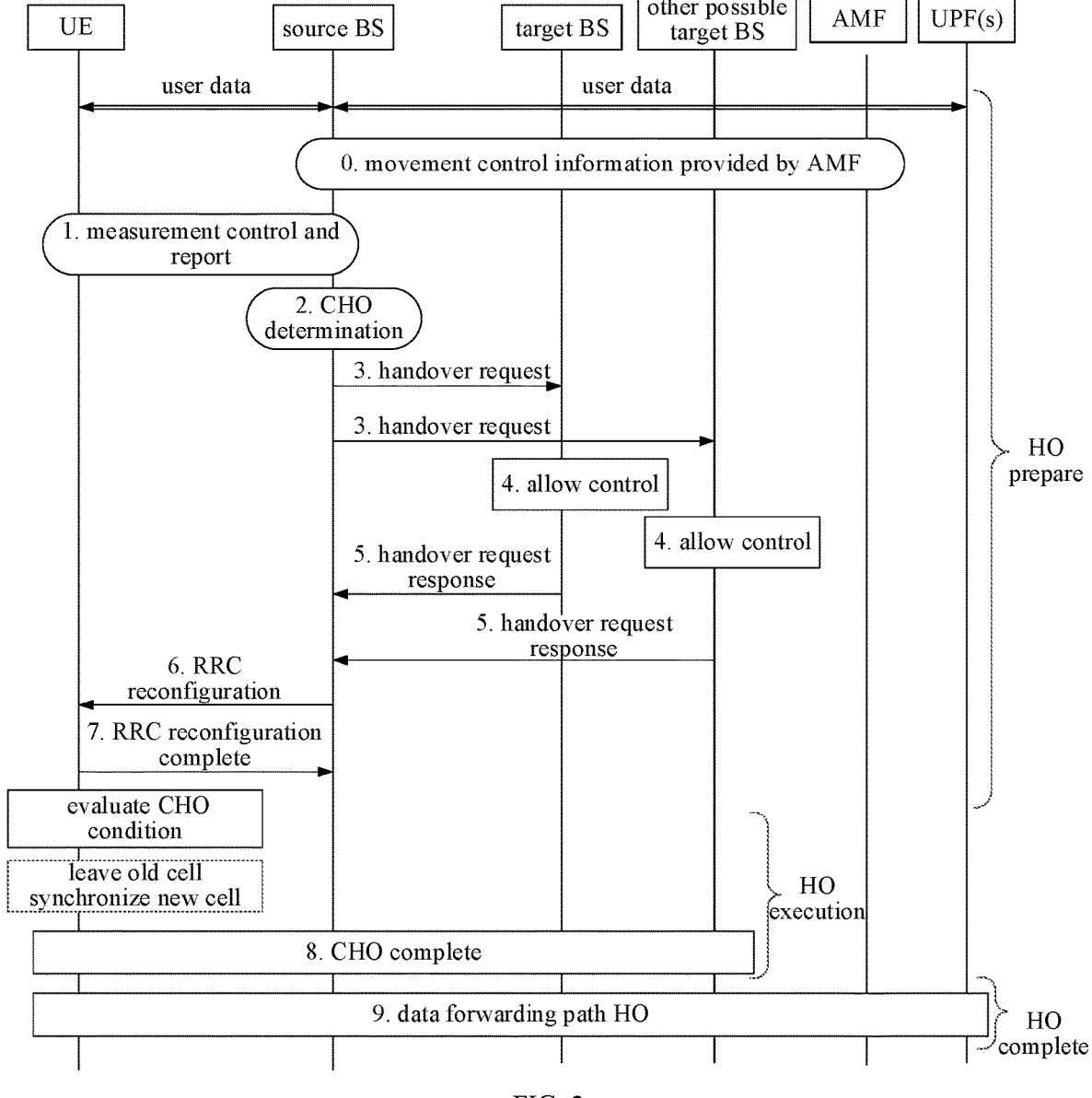
FIG. 2 is a call flow diagram of conditional handover in the related art.
Figure 3:
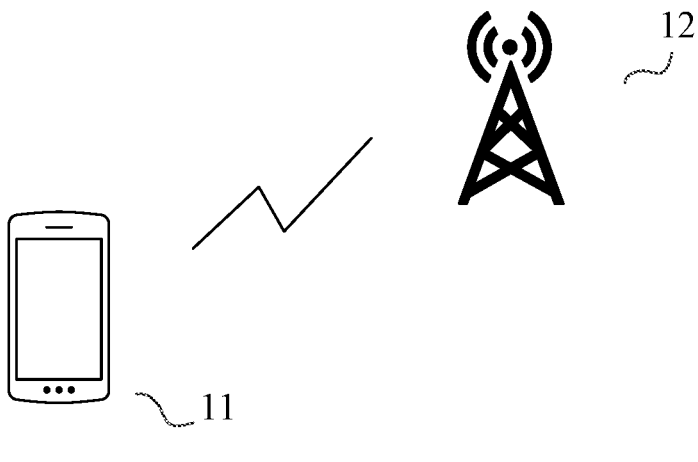
FIG. 3 is a diagram of an exemplary application scenario provided in embodiments of the disclosure.

In an optional implementation, FIG. 3 is a diagram of an exemplary application scenario provided in embodiments of the disclosure. As shown in FIG. 3, data communication is performed between terminal 11 and base station 12. In the embodiments of the disclosure, terminal 11 may refer to various forms of UEs, access terminals, user units, user stations, mobile radio stations, mobile stations (MS), remote stations, remote terminals, mobile equipments, user terminals, terminal equipments, wireless communication equipments, user agents, or user devices. The terminal equipment may also be a cellular telephone, a cordless telephone, a session initiation protocol (SIP) phone, a wireless local loop (WLL) station, a personal digital assistant (PDA), a handheld device or computing device with a wireless communication function, or other processing device connected to a wireless modem, a vehicle-mounted device, a wearable device, a terminal device in a future 5G network, or a terminal device in a future evolved public land mobile network (PLMN), etc. The embodiments of the disclosure are not limited thereto.

The base station (BS for short) 12 in embodiments of the disclosure, also referred to as a base station device, is a device deployed in a radio access network (RAN) to provide a wireless communication function. For example, devices providing base station functions in a 2G network include a base transceiver station (BTS for short), devices providing base station functions in a 3G network include NodeB, devices providing base station functions in a 4G network include evolved NodeB (eNB), devices providing base station functions in a wireless local area network (WLAN) include an access point (AP), devices providing base station functions in a 5G New Radio (NR) include gNB and next generation-evolved Node B (ng-eNB), in which gNB communicates with the terminal by adopting NR technology, ng-eNB communicates with the terminal by adopting evolved universal terrestrial radio access (E-UTRA), and gNB and ng-eNB are connected to 5G core network (CN). The base station in embodiments of the disclosure also includes devices providing base station functions in future new communication systems and the like. Embodiments of the disclosure are not limited thereto.

In the embodiments of the disclosure, a unidirectional communication link from an access network to a terminal is defined as a downlink, data transmitted on the downlink is downlink data, and a transmission direction of the downlink data is called a downlink direction; a unidirectional communication link from the terminal to the access network is defined as an uplink, data transmitted on the uplink is uplink data, and a transmission direction of the uplink data is called an uplink direction.

Figure 4:
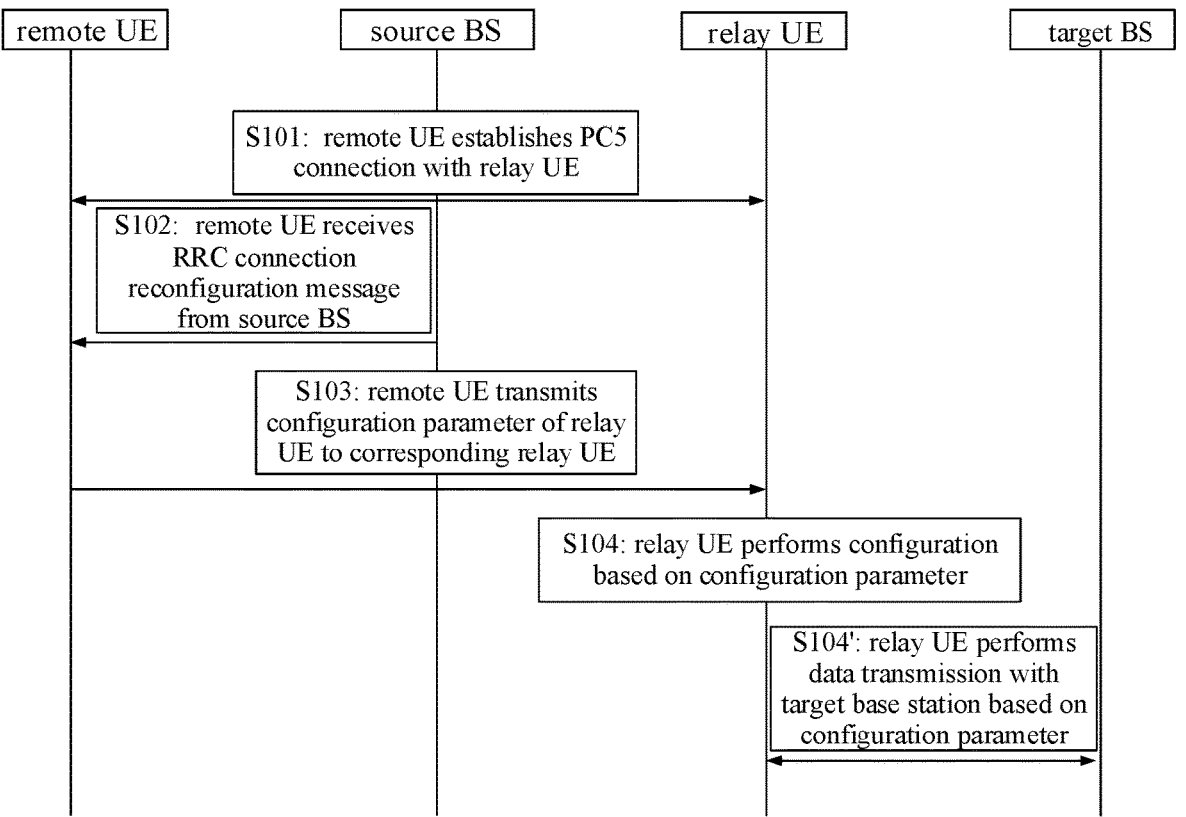
FIG. 4 is a schematic flow diagram of a data transmission method provided in embodiments of the disclosure.

FIG. 4 is a schematic flow diagram of a data transmission method provided in embodiments of the disclosure. The method can be executed by a data transmission device. The device can be implemented by software and/or hardware. The device can be implemented by part or all of the terminal and the base station. The following describes an example where the data transmission method is executed by the remote UE, the source base station, the relay UE, and the target base station. As shown in FIG. 4, the data transmission method provided in this embodiment can include the following.

S101, the remote UE establishes PC5 connection with the relay UE.

In S101, the remote UE establishes PC5 connection with at least one relay UE meeting a condition and receives information related to the at least one relay UE from the at least one relay UE. The meeting the condition means that: a measured signal quality of the relay UE meets a threshold configured by the source base station, meets a quality threshold or load threshold configured in pre-configuration, or meets a threshold for establishing the PC5 connection.

The information related to the at least one relay UE includes one or more of: whether the at least one relay UE is in a non-connected state, a state of the at least one relay UE, information of a target base station corresponding to the at least one relay UE, and a measurement result of the at least one relay UE.

The non-connected state in embodiments of the disclosure may be an RRC_INACTIVE state or an RRC_IDLE state. The state of the relay UE includes an RRC_CONNECTED state, the RRC_INACTIVE state, and the RRC_IDLE state.

The information of the target base station includes information such as cell identity (ID) or identity of the target base station, and the measurement result of the relay UE includes information such as a signal quality and quality of service (QOS) status from the relay UE to the base station, load of the relay UE, bandwidth of the relay UE, and the like.

S102: the remote UE receives a radio resource control (RRC) connection reconfiguration message from the source base station, where the RRC connection reconfiguration message carries a configuration parameter(s) of the relay UE.

In an optional implementation, the remote UE receives other RRC messages or information from the source base station, which carries the configuration parameter of the relay UE.

The configuration parameter of the relay UE includes one or more combinations of: a configuration parameter of a random access channel (RACH), a configuration parameter of a radio bearer, and a configuration parameter of a cell group.

In an optional implementation, the configuration parameter of the relay UE is an updated configuration parameter.

In an optional implementation, the RRC connection reconfiguration message also carries a handover condition, and the remote UE determines a target relay UE based on the handover condition. The handover condition further includes configuring conditions such as evaluating whether the relay UE is in the non-connected state and/or the Qos (including bandwidth) of the relay UE as a condition for triggering the handover. In one example, if a certain relay UE is in the non-connected state and a channel environment between the remote UE and the relay UE meets a certain condition, the relay UE is determined as the target relay UE. In another example, to reduce a delay of establishing connection by the relay UE, a relay UE in the connected state is determined as the target relay UE. In yet another example, a relay UE capable of providing greater bandwidth or more resources to the remote UE is determined as the target relay UE.

In an optional implementation, the RRC connection reconfiguration message further carries a handover condition for determining a link condition between the relay UE and the target base station, and the remote UE transmits the handover condition to the corresponding relay UE. After the relay UE receives the handover condition, the link condition between the relay UE and the target base station is monitored and the remote UE is informed if the link condition meets the handover condition.

In an optional implementation, the RRC connection reconfiguration message further carries a handover condition for determining a link condition between the relay UE and the target base station. The remote UE requires, based on the handover condition, the corresponding relay UE to monitor the link condition between the relay UE and the target base station and inform the remote UE of the detected link condition. The remote UE determines the target relay UE based on the Clean Copy received information and the handover condition.

S103, the remote UE transmits the configuration parameter of the relay UE to the corresponding relay UE. In an implementation, the remote UE transmits the configuration parameter of the relay UE through PC5-RRC signaling.

In an optional implementation, the RRC connection reconfiguration message further carries an indication message for forwarding the configuration parameter to the relay UE, and the remote UE transmits the configuration parameter of the relay UE to the corresponding relay UE based on the indication message.

In an optional implementation, the remote UE receives configuration parameters of relay UEs and immediately forwards configuration parameters to relay UEs meeting the condition, triggering the relay UE to establish the connection with the target base station. It should be noted that, each relay UE has its corresponding configuration parameter. In this embodiment, for each relay UE meeting the condition, the remote UE forwards, to the relay UE meeting the condition, a corresponding configuration parameter thereof.

In an optional implementation, the remote UE determines the target relay UE for handover from the relay UEs that meet the condition and transmits the configuration parameter to the target relay UE. In one example, the remote UE determines the target relay UE based on the above handover condition. In another example, the remote UE determines the target relay UE based on other methods.

S104, the relay UE performs configuration based on the configuration parameter.

In an optional implementation, the configuration parameter received by the relay UE includes the configuration parameter of the radio bearer. In this implementation, the relay UE is in the non-connected state and configures the radio bearer based on the configuration parameter of the radio bearer.

S104', the relay UE performs data transmission with the target base station based on the configuration parameter.

In an optional implementation, the configuration parameter received by the relay UE include the configuration parameter of the RACH. In one example, the relay UE uses a dedicated RACH resource(s) for data transmission, where the dedicated RACH resource includes dedicated preamble and/or a data transmission resource. In another example, the relay UE uses a dedicated RACH parameter(s) such as a power ramp parameter or a new backoff value for data transmission, where the RACH parameter may also include an indication that access control is not required, to improve the RACH success rate.

In this implementation, the relay UE is in the non-connected state. Specifically, if the relay UE is in the IDLE state, the RRC connection is established with the target base station based on the configuration parameter of the RACH; if the relay UE is in the INACTIVE state, the RRC connection with the target base station is resumed based on the configuration parameter of the RACH.

Figure 5:
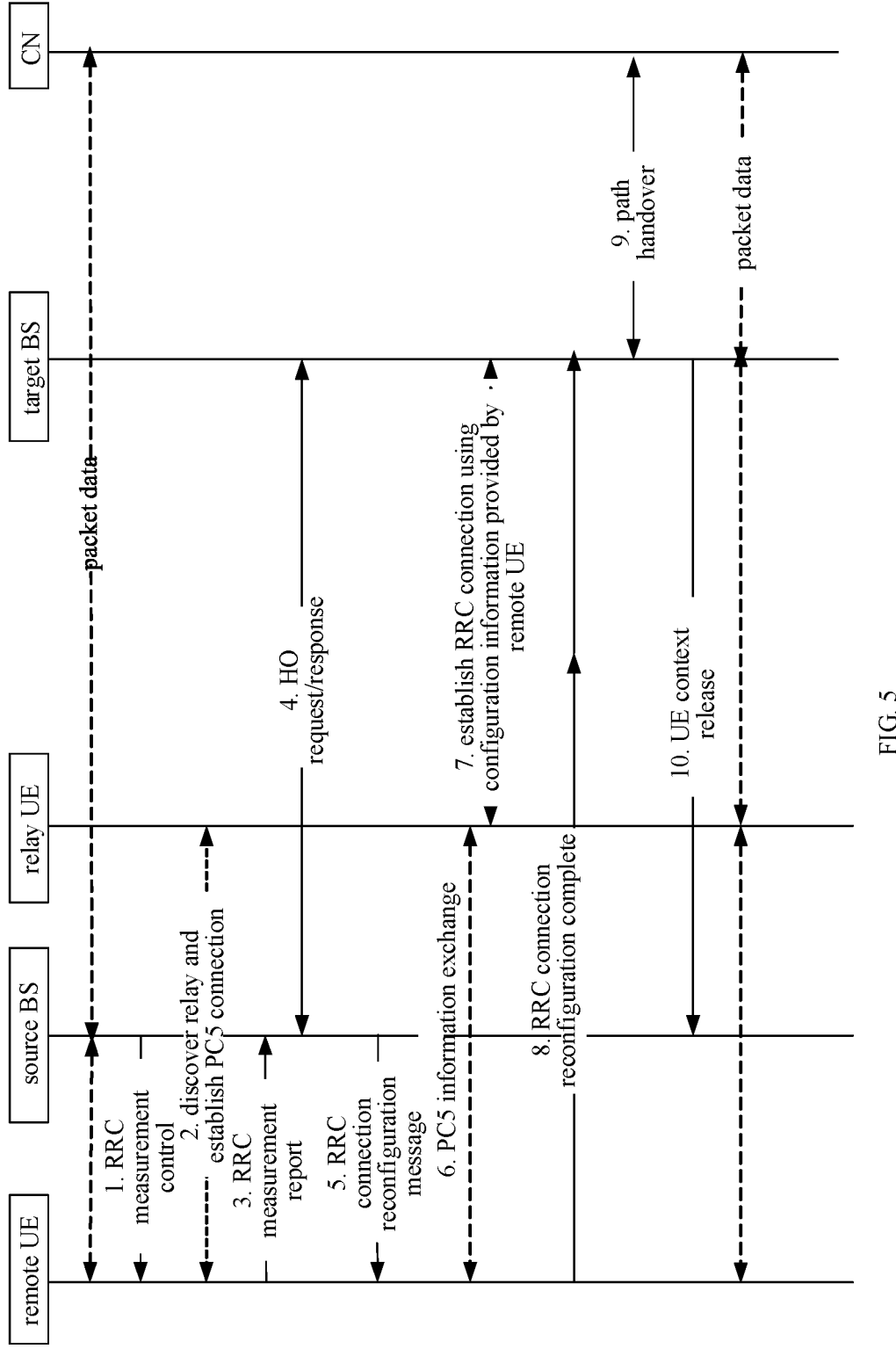
FIG. 5 is a call flow diagram of handover from Uu to PC5 across base stations provided in embodiments of the disclosure.
Figure 6:
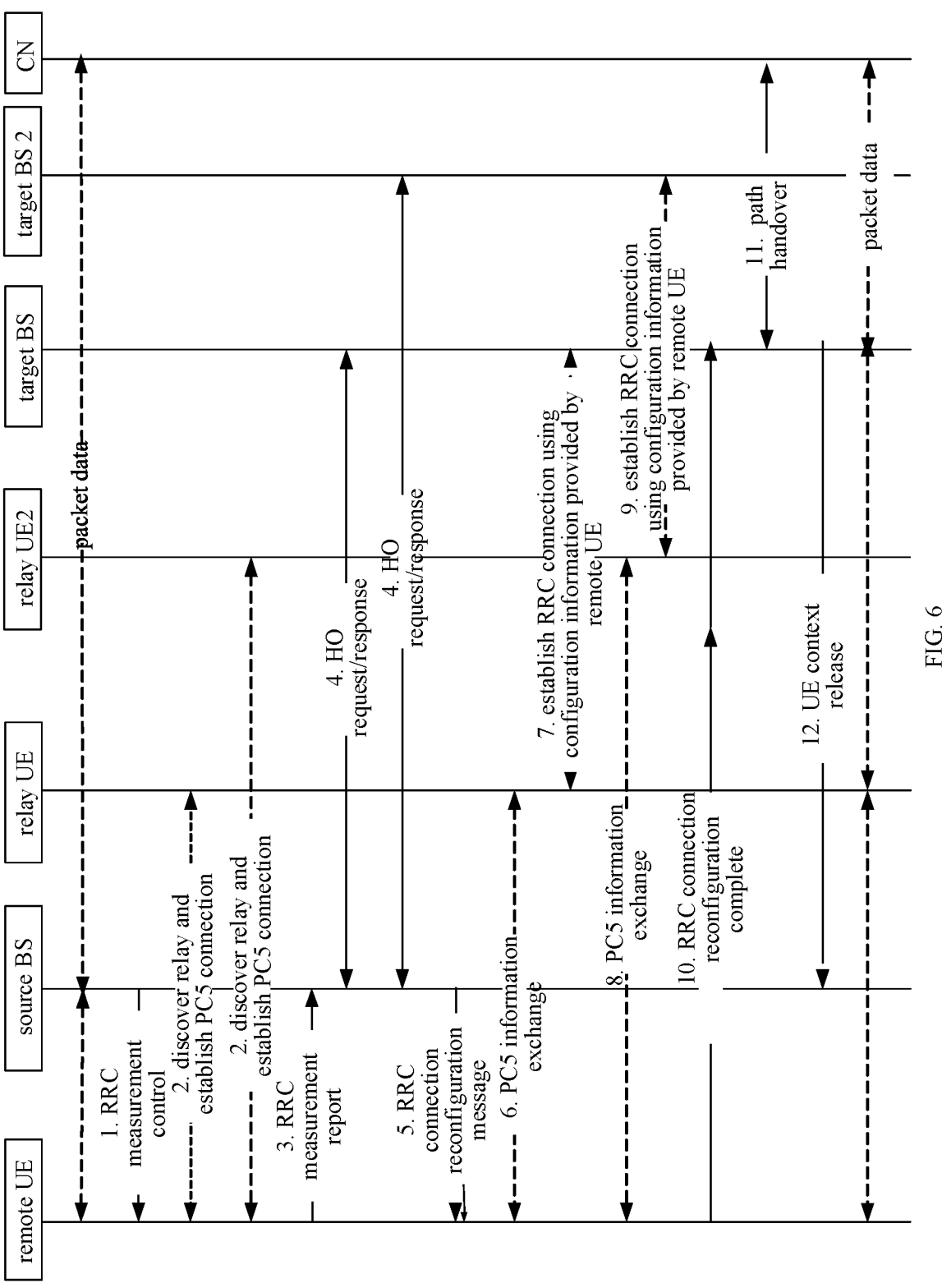
FIG. 6 is a call flow diagram of another handover from Uu to PC5 across base stations provided in embodiments of the disclosure.

FIG. 5 and FIG. 6 each are a call flow diagram of handover from Uu to PC5 across base stations provided in embodiments of the disclosure. For a detailed handover process in which the number of relay UEs meeting the condition is one, reference is made to the flow chart shown in FIG. 5, and for a detailed handover process in which the number of relay UEs meeting the condition is two, reference is made to the flow chart shown in FIG. 6.

In another optional implementation, the configuration parameter received by the relay UE includes a configuration parameter of a preconfigured uplink resource(s). The relay UE performs data transmission with the preconfigured uplink resource.

In an optional implementation, the configuration parameter received by the relay UE includes a configuration parameter of an RACH and a configuration parameter of a radio bearer. If the relay UE is in the INACTIVE state, an RRC resume complete message RRCresumecomplete is transmitted to the target base station, and an RRC reconfiguration complete message RRCReconfigurationComplete from the remote UE is transmitted to the target base station, to complete the handover process. Alternatively, the RRC reconfiguration complete message RRCReconfiguration-Complete from the remote UE is first transmitted to the target base station through the configured resource, to complete the handover process.

In another optional implementation, the configuration parameter received by the relay UE includes a configuration parameter of an RACH and a configuration parameter of a radio bearer. If the relay UE is in the INACTIVE state, the RRC reconfiguration complete message RRCReconfigurationComplete from the remote UE is included into an RRC resume request message RRCresumerequest or the RRC resume complete message RRCresumecomplete from the relay UE to the target base station, to be transmitted to the target base station through the RACH procedure or the data transmission procedure.

In an optional implementation, the configuration parameter received by the relay UE include a configuration parameter of an RACH and a configuration parameter of signalling radio bearer (SRB) 1/2 or other radio bearer. If the relay UE is in the IDLE state, the RRC reconfiguration complete message RRCReconfigurationComplete transmitted by the remote UE can be transmitted to the target base station directly in the RACH procedure (carried in Msg3 or MsgB message), to accelerate the subsequent connection establishment process.

Figure 7:
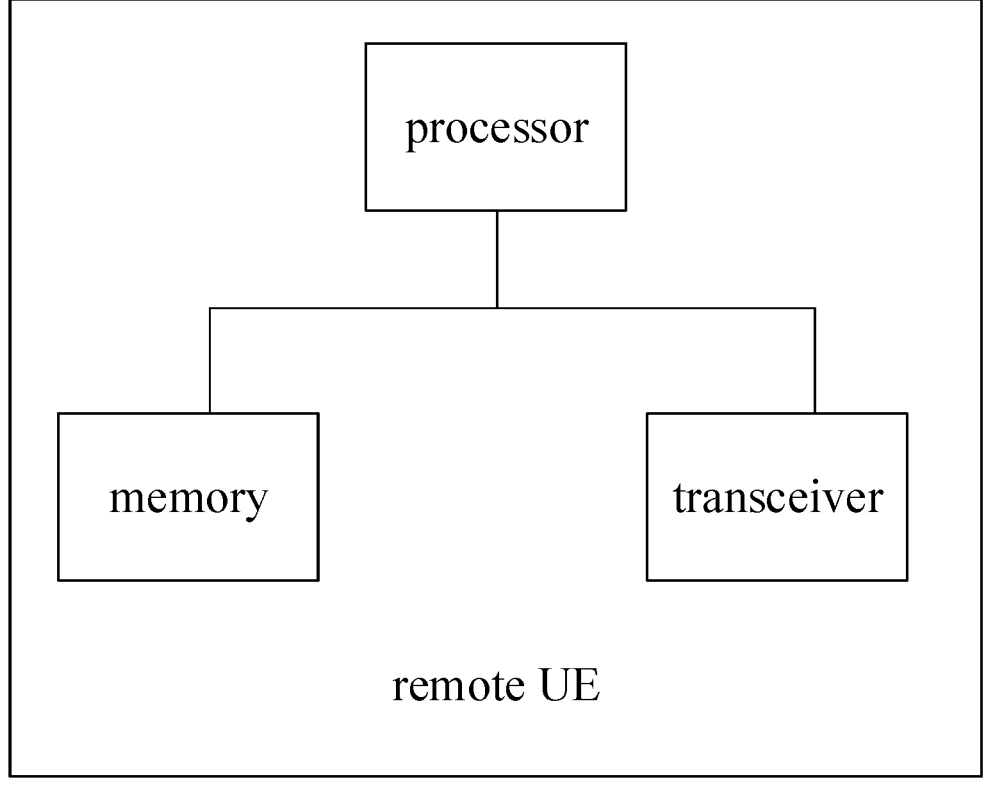
FIG. 7 is a schematic structural diagram of a remote user equipment (UE) provided in embodiments of the disclosure.

Embodiments of the disclosure further provide a remote UE. Referring to FIG. 7, the remote UE includes a transceiver, a memory storing program codes, and a processor coupled with the memory and the transceiver. The processor is configured to invoke the program codes to perform the method performed by the remote UE.

Embodiments of the disclosure further provide a relay UE. The remote UE includes at least one processor and a memory in communication with the at least one processor. The memory stores instructions executable by the at least one processor. The instructions are executed by the at least one processor to cause the at least one processor to perform the method performed by the relay UE.

Embodiments of the disclosure further provide a non-transitory computer-readable storage medium storing computer instructions. The computer instructions are configured to cause a computer to execute the method executed by the remote UE or relay UE.

The readable storage media may include, but are not limited to, portable disks, hard disks, random access memories, read-only memories, erasable programmable read-only memories, optical storage devices, magnetic storage devices, or any suitable combination of the above.

In a possible embodiment, the disclosure may also be implemented in the form of a program product. The program product includes program codes. When the program product is executed by a terminal device, the program codes are configured to cause the terminal device to execute operations of the data transmission method.

The program codes for carrying out the disclosure may be written in any combination of one or more programming languages. The program codes may be executed entirely on the user equipment, partly on the user equipment, as a stand-alone software package, partly on the user equipment and partly on a remote device, or entirely on the remote device.

A UE and a data transmission method therefor, and a relay UE and a data transmission method therefor are provided in the disclosure, to overcome the technical problem of delay of handover across base stations for the remote UE caused by the related art where the relay UE needs to be paged before connection is established when the relay UE is in the non-connected state.

The disclosure solves the above technical problem through the following technical solutions.

A data transmission method for a remote UE is provided. The method includes: receiving a RRC connection reconfiguration message, where the RRC connection reconfiguration message carries a configuration parameter of a relay UE; and transmitting the configuration parameter to a corresponding relay UE.

Optionally, receiving the RRC connection reconfiguration message includes: receiving the RRC connection reconfiguration message from a source base station.

Optionally, the RRC connection reconfiguration message further carries an indication message for forwarding the configuration parameter to a relay UE, and transmitting the configuration parameter to the corresponding relay UE includes: transmitting the configuration parameter to the corresponding relay UE based on the indication message.

Optionally, prior to receiving the RRC connection reconfiguration message, the method further includes: establishing PC5 connection with at least one relay UE meeting a condition; and receiving information related to the at least one relay UE from the at least one relay UE.

Optionally, the information related to the at least one relay UE includes one or more of: whether the at least one relay UE is in a non-connected state, a state of the at least one relay UE, information of a target base station corresponding to the at least one relay UE, and a measurement result of the at least one relay UE.

Optionally, the RRC connection reconfiguration message further carries a handover condition, and the method further includes: determining a target relay UE based on the handover condition.

Optionally, the handover condition includes at least one of whether the at least one relay UE is in a non-connected state or a quality of service of the at least one relay UE.

Optionally, the RRC connection reconfiguration message further carries a handover condition for determining a link condition between the at least one relay UE and a target base station, and the method further includes: transmitting the handover condition to the corresponding relay UE.

Optionally, the method further includes: receiving from the corresponding relay UE a notification indicating that the handover condition is met, where the notification is transmitted to the remote UE when a link condition between the corresponding relay UE and the target base station meets the handover condition.

Optionally, transmitting the configuration parameter to the corresponding relay UE includes: transmitting the configuration parameter to each relay UE meeting the condition.

Optionally, transmitting the configuration parameter to the corresponding relay UE includes: determining a target relay UE from the at least one relay UE meeting the condition; and transmitting the configuration parameter to the target relay UE.

Optionally, the configuration parameter includes one or more combinations of: a configuration parameter of an RACH, a configuration parameter of a radio bearer, and a configuration parameter of a cell group.

A data transmission method for a relay UE is further provided. The method includes: receiving a configuration parameter of the relay UE from a remote UE; and performing at least one of configuration or data transmission based on the configuration parameter if the relay UE is in a non-connected state.

Optionally, the configuration parameter includes a configuration parameter of an RACH, and performing data transmission based on the configuration parameter includes: performing data transmission with a dedicated RACH resource or a dedicated RACH parameter. Alternatively, the configuration parameter includes a configuration parameter of a preconfigured uplink resource, and performing data transmission based on the configuration parameter includes: performing data transmission with the preconfigured uplink resource.

Optionally, the configuration parameter includes a configuration parameter of an RACH, and performing data transmission based on the configuration parameter if the relay UE is in the non-connected state includes: establishing RRC connection with a target base station based on the configuration parameter of the RACH if the relay UE is in an IDLE state; and resuming the RRC connection with the target base station based on the configuration parameter of the RACH if the relay UE is in an INACTIVE state.

Optionally, the configuration parameter includes a configuration parameter of a radio bearer, and performing data transmission based on the configuration parameter if the relay UE is in the non-connected state includes: configuring the radio bearer based on the configuration parameter if the relay UE is in the non-connected state.

Optionally, prior to receiving the configuration parameter of the relay UE from the remote UE, the method further includes: establishing PC5 connection with the remote UE; and transmitting information related to the relay UE to the remote UE.

Optionally, information related to the relay UE includes one or more of: whether the relay UE is in the non-connected state, information of a target base station corresponding to the relay UE, and a measurement result of the relay UE.

Optionally, the method further includes: monitoring a link condition between the relay UE and a target base station; and informing the remote UE, if the link condition meets a handover condition.

Optionally, the configuration parameter includes a configuration parameter of an RACH and a configuration parameter of a radio bearer, and the method further includes: transmitting to a target base station an RRC resume complete message and an RRC reconfiguration complete message from the remote UE, if the relay UE is in an INACTIVE state.

Optionally, the configuration parameter includes a configuration parameter of an RACH and a configuration parameter of a radio bearer, and the method further includes: transmitting an RRC resume complete message to a target base station if the relay UE is in an INACTIVE state, where the RRC resume complete message includes an RRC reconfiguration complete message from the remote UE; or transmitting an RRC resume request message to the target base station if the relay UE is in the INACTIVE state, where the RRC resume request message includes the RRC reconfiguration complete message from the remote UE.

Optionally, the configuration parameter includes a configuration parameter of an RACH and a configuration parameter of a radio bearer, and the method further includes: transmitting to a target base station an RRC reconfiguration complete message from the remote UE in an RACH procedure if the relay UE is in an IDLE state.

A remote UE is further provided. The remote UE includes at least one processor and a memory in communication with the at least one processor. The memory stores instructions executable by the at least one processor, which are executed by the at least one processor to cause the at least one processor to perform the method of the above.

A relay UE is further provided. The relay UE includes at least one processor and a memory in communication with the at least one processor. The memory stores instructions executable by the at least one processor, which are executed by the at least one processor to cause the at least one processor to perform the method of the above.

A non-transitory computer-readable storage medium is provided. The non-transitory computer-readable storage medium stores computer instructions. The computer instructions are configured to cause a computer to execute the method of the above.

The progressive advantageous effect of the disclosure is as follows. The configuration parameter of the relay UE is forwarded to the relay UE through the remote UE, which accelerates connection establishment between the relay UE and the target base station and avoids resource waste caused by paging the candidate relay UE for connection establishment. In addition, in the disclosure, the handover condition is carried in the RRC connection reconfiguration message, so that the data transmission method for the remote UE can further support the conditional handover enhancement.

Although the specific implementations of the disclosure are described above, those skilled in the art should understand that these are merely for illustration, and the protection scope of the disclosure is defined by the appended claims. Those skilled in the art can make various changes or modifications to these implementations without departing from the principle and essence of the disclosure, but these changes and modifications all fall within the protection scope of the disclosure.

What is claimed is:

1. A data transmission method for a remote user equipment (UE), comprising:
receiving a radio resource control (RRC) connection reconfiguration message, the RRC connection reconfiguration message carrying a configuration parameter of a relay UE; and
transmitting the configuration parameter to a corresponding relay UE,
wherein
the RRC connection reconfiguration message further carries an indication message for forwarding the configuration parameter to a relay UE, and
the transmitting the configuration parameter to the corresponding relay UE comprises transmitting the configuration parameter to the corresponding relay UE based on the indication message.

2. The method of claim 1, wherein receiving the RRC connection reconfiguration message comprises:
receiving the RRC connection reconfiguration message from a source base station.

3. The method of claim 1, wherein prior to receiving the RRC connection reconfiguration message, the method further comprises:

establishing PC5 connection with at least one relay UE meeting a condition; and receiving information related to the at least one relay UE from the at least one relay UE.

4. The method of claim 3, wherein the information related to the at least one relay UE comprises one or more of: whether the at least one relay UE is in a non-connected state, a state of the at least one relay UE, information of a target base station corresponding to the at least one relay UE, and a measurement result of the at least one relay UE.

5. The method of claim 3, wherein the RRC connection reconfiguration message further carries a handover condition, and the method further comprises:

determining a target relay UE based on the handover condition.

6. The method of claim 5, wherein the handover condition comprises at least one of whether the at least one relay UE is in a non-connected state or a quality of service of the at least one relay UE.

7. The method of claim 3, wherein the RRC connection reconfiguration message further carries a handover condition for determining a link condition between the at least one relay UE and a target base station, and the method further comprises:

transmitting the handover condition to the corresponding relay UE.

8. The method of claim 7, further comprising:

receiving from the corresponding relay UE a notification indicating that the handover condition is met, wherein the notification is transmitted to the remote UE when a link condition between the corresponding relay UE and the target base station meets the handover condition.

9. The method of claim 3, wherein transmitting the configuration parameter to the corresponding relay UE comprises:

transmitting the configuration parameter to each of the at least one relay UE meeting the condition.

10. The method of claim 3, wherein transmitting the configuration parameter to the corresponding relay UE comprises:

determining a target relay UE from the at least one relay UE meeting the condition; and transmitting the configuration parameter to the target relay UE.

11. The method of claim 1, wherein the configuration parameter comprises one or more combinations of: a configuration parameter of a random access channel (RACH), a configuration parameter of a radio bearer, and a configuration parameter of a cell group.

12. A remote user equipment (UE), comprising:

a transceiver;

a memory storing program codes; and a processor coupled with the memory and the transceiver and configured to invoke the program codes to:

receive, with the transceiver, a radio resource control (RRC) connection reconfiguration message, the RRC connection reconfiguration message carrying a configuration parameter of a relay UE; and transmit, with the transceiver, the configuration parameter to a corresponding relay UE, wherein the RRC connection reconfiguration message further carries an indication message for forwarding the configuration parameter to a relay UE, and the processor configured to invoke the program codes to transmit, with the transceiver, the configuration parameter to the corresponding relay UE is configured to invoke the program codes to: transmit, with the transceiver, the configuration parameter to the corresponding relay UE based on the indication message.

13. A non-transitory computer-readable storage medium, storing computer instructions configured to cause a remote user equipment (UE) to:

receive a radio resource control (RRC) connection reconfiguration message, the RRC connection reconfiguration message carrying a configuration parameter of a relay UE; and transmit the configuration parameter to a corresponding relay UE, wherein the RRC connection reconfiguration message further carries an indication message for forwarding the configuration parameter to a relay UE, and the remote UE caused to transmit the configuration parameter to the corresponding relay UE is caused to transmit the configuration parameter to the corresponding relay UE based on the indication message.

14. The remote UE of claim 12, wherein the processor configured to invoke the program codes to receive, with the transceiver, the RRC connection reconfiguration message is configured to invoke the program codes to:

receive, with the transceiver, the RRC connection reconfiguration message from a source base station.

15. The remote UE of claim 12, wherein the processor is further configured to invoke the program codes to:

establish PC5 connection with at least one relay UE meeting a condition; and receive, with the transceiver, information related to the at least one relay UE from the at least one relay UE.

16. The remote UE of claim 15, wherein the information related to the at least one relay UE comprises one or more of: whether the at least one relay UE is in a non-connected state, a state of the at least one relay UE, information of a target base station corresponding to the at least one relay UE, and a measurement result of the at least one relay UE.

17. The remote UE of claim 15, wherein the RRC connection reconfiguration message further carries a handover condition, and the processor is further configured to invoke the program codes to:

determine a target relay UE based on the handover condition.

18. The remote UE of claim 17, wherein the handover condition comprises at least one of whether the at least one relay UE is in a non-connected state or a quality of service of the at least one relay UE.

19. The remote UE of claim 15, wherein the RRC connection reconfiguration message further carries a handover condition for determining a link condition between the at least one relay UE and a target base station, and the processor is further configured to invoke the program codes to:

transmit the handover condition to the corresponding relay UE.

20. The remote UE of claim 12, wherein the configuration parameter comprises one or more combinations of: a configuration parameter of a random access channel (RACH), a configuration parameter of a radio bearer, and a configuration parameter of a cell group.

* * * * *